July 24, 1962 L. H. BLOOD 3,045,586
CONVEYOR PRESS
Original Filed Oct. 9, 1952 3 Sheets-Sheet 3
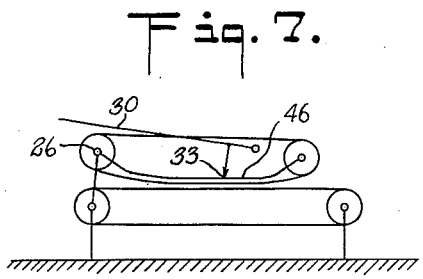
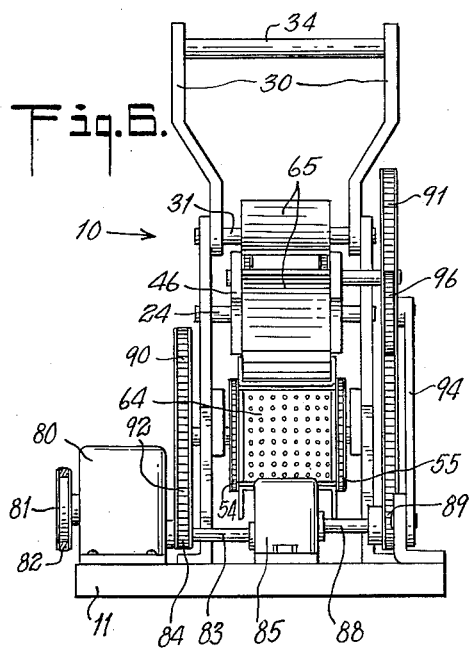
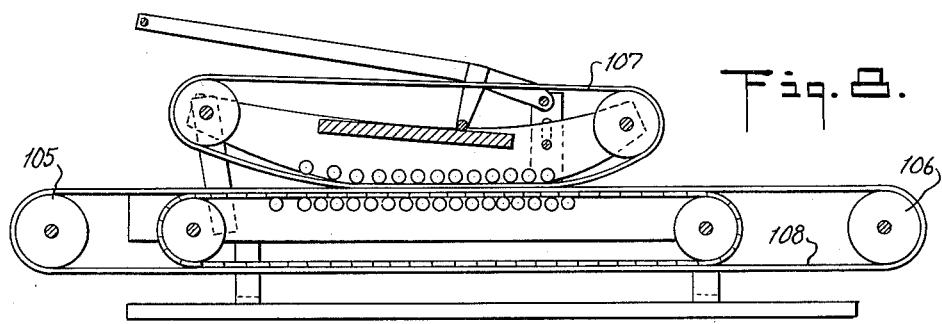
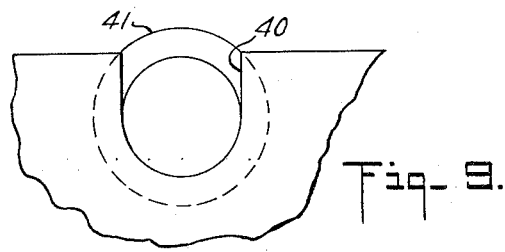
INVENTOR.
LEWIS H. BLOOD
BY Howard J. Jeanbrun
ATTORNEY

United States Patent Office 3,045,586
Patented July 24, 1962

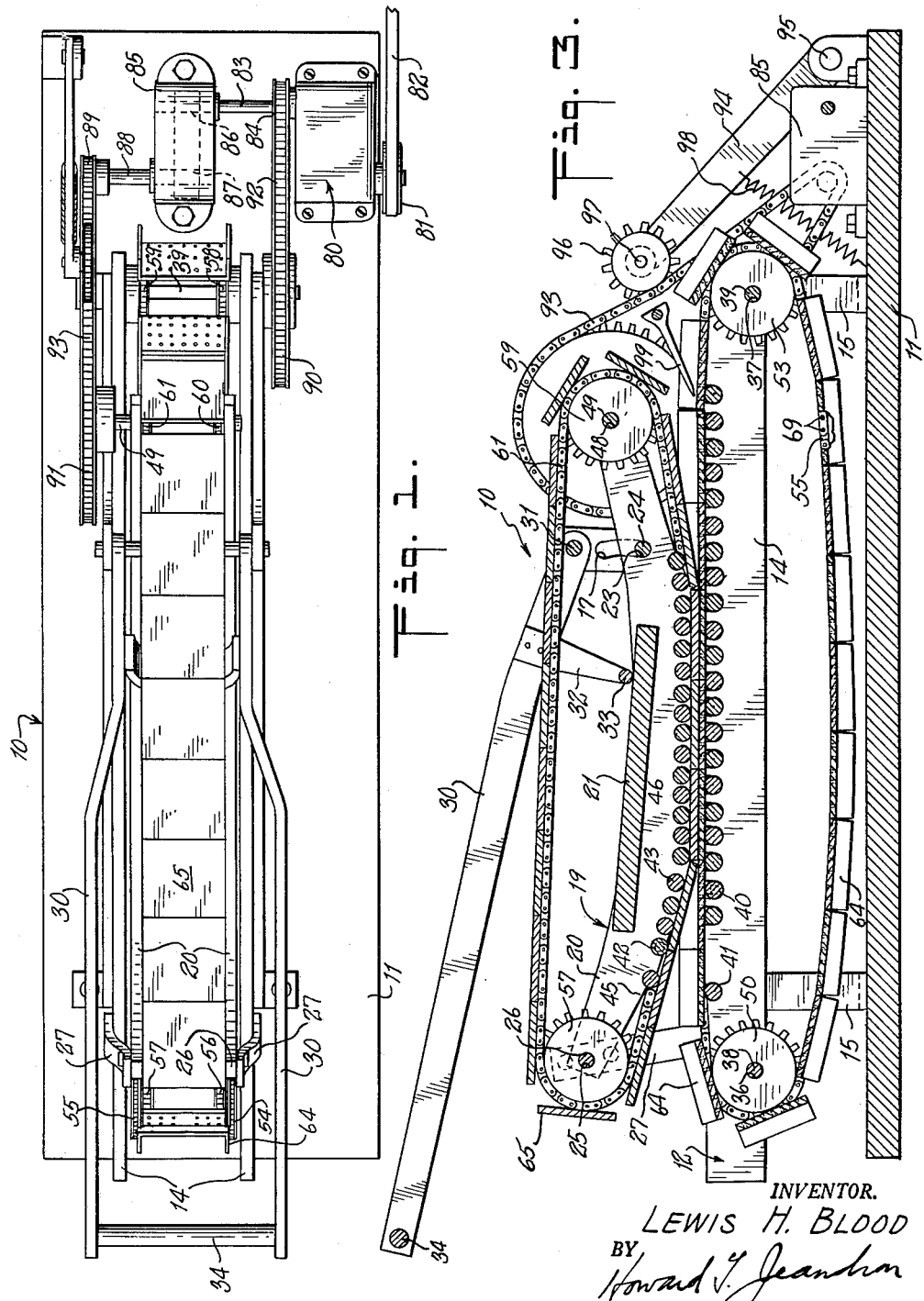

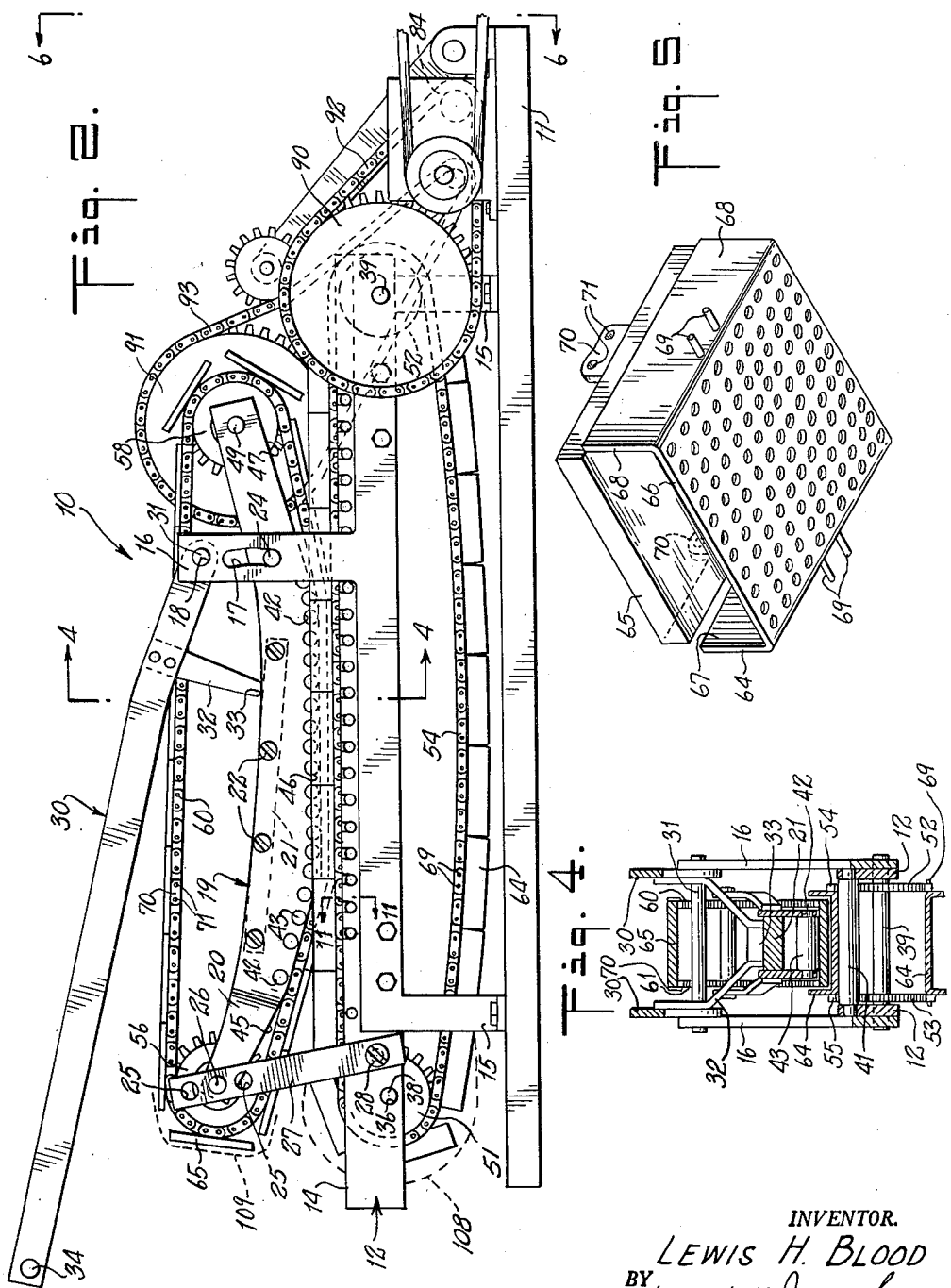

3,045,586
CONVEYOR PRESS
Lewis H. Blood, Leonardo, N.J., assignor to Expeller Press and Chemical Corporation, Leonardo, N.J., a corporation of New Jersey
Continuation of application Ser. No. 313,913, Oct. 9, 1952. This application Apr. 28, 1959, Ser. No. 809,575
2 Claims. (Cl. 100—154)

This invention relates to presses and more particularly to a conveyor press.

This is a continuation of my abandoned application Serial No. 313,913, filed October 9, 1952, title "Conveyor Press."

It is well-known to provide a piston press for dehydrating a material. However, this type of press is not continuous in its operation; it must be loaded for each compression stroke. It is also well-known to provide converging conveyors to pack or compress a dry material such as hay into a compressed position for baling. This provides a continuous compressing operation.

It is an object of this invention to provide a press comprised of converging conveyors in which one of the conveyors is pivotally mounted and both conveyors are provided with especially designed conveyor belts, in which the conveyor belts are provided with links that fit into a mating relationship, and in which the lower portion of said conveyor belt is perforated to permit the fluid to pass therethrough during the pressing operation, and in which there is a predetermined area where the mating belts will meet in a parallel relationship, and in which one belt is supported by rollers over a predetermined pressing area to retain the link belt of the conveyor in a horizontal relationship along the upper stretch of said lower belt and the upper conveyor is provided with a plurality of rollers positioned in juxta-position to the lower stretch of the mating upper link belt to direct and retain said belt into a parallel mating relationship with the other lower conveyor belt, and in which the links of the lower conveyor are attached to a first chain and the links of the upper conveyor are attached to a second chain and in which means are provided to drive both chains at the same speed.

Other objects of this invention may be apparent by reference to the accompanying detailed description and the drawings in which:

FIG. 1 is a plan view of the press,
FIG. 2 is a side elevational view of the press,
FIG. 3 is a vertical section through the central portion of the conveyors shown in FIG. 1,
FIG. 4 is a cross sectional view taken on line 4—4 of FIG. 2 portions being omitted for clarity,
FIG. 5 is an exploded perspective view illustrating one link of the lower and one link of the upper conveyor belts,
FIG. 6 is an end elevational view taken on line 6—6 of FIG. 2,
FIG. 7 is a schematic illustration of the converging conveyors and cantilever arm,
FIG. 8 is a further embodiment of the invention illustrated partially in cross section, and
FIG. 9 is an enlarged detail of the roller mounting.

Referring to the drawings and particularly to FIGS. 1, 2 and 3, there is illustrated a press 10 which is comprised of a bed plate 11 on which a frame 12 is mounted. The frame 12 includes a pair of spaced channel members 14 supported on legs 15 that are in turn mounted on the bed plate 11. The channel members 14 are provided with upstanding legs 16 that are spaced a predetermined distance from one end of said channel members. Said legs 16 are provided with elongated slots 17 and upper apertures 18. There is also provided an upper conveyor frame 19 that is comprised of a pair of channel members 20, said channel members 20 being joined in a parallel relationship by a plate 21, said plate 21 being riveted or bolted to each channel member by a plurality of studs 22. Said channel members 20 are provided with a pair of aligned apertures 23 through which a shaft 24 may be mounted, shaft 24 extending through the arcuate slot 17 of each leg 16. There is also provided an aperture 25 in the opposite end of each channel 20 in an aligned relationship. A shaft 26 is mounted through the apertures 25. A pair of legs 27 are affixed to the exterior side of each channel 14 by a stud or bolt 28. Said legs 27 at their opposite end are provided with a plurality of apertures 25 spaced equally from each other to permit mounting shaft 26 therethrough. The particular pair of apertures chosen for mounting shaft 26 will in turn set the press according to the desired opening for the material being set into the press and the type of material to be pressed. It is apparent that the frame 19 will be pivotally supported by the shaft 26 and the degree of pivotal movement of frame 19 is limited by the slot 17. A pair of cantilever arms 30 are provided and the arms 30 are pivotally mounted by means of a shaft 31, shaft 31 passing through the end of arms 30 and into both apertures 18 of the legs 16. Arms 30 are also provided with legs 32, a rotatable shaft 33 passes through the lower ends of legs 32 to thus provide the fulcrum or bearing point, the bearing point or shaft 33 resting upon the flat plate 21 of the frame 19. Arms 30 are also provided with a bar or handle 34 which permits the attachment of a weight (not shown) or the application of hand pressure. The frame 12 at one end thereof is provided with aligned apertures 36 on each side thereof and the frame 12 is also provided at the opposite end with aligned apertures 37 on each side thereof. A shaft 38 is mounted through the apertures 36 and a shaft 39 is mounted through the apertures 37. Shaft 38 is provided with a pair of spaced sprockets 50 and 51 positioned adjacent to the channel members 14. Shaft 39 is also provided with a pair of spaced sprockets 52 and 53 positioned adjacent to the channel members 14. A pair of chains 54 and 55 are mounted so that chain 54 will connect sprockets 51 and 52 while chain 55 will connect sprockets 50 and 53. Channels 14 are also provided on each side with a plurality of U-shaped cutouts 40 along their upper edge to permit mounting a plurality of rollers 41 in an aligned relationship. Bearing boxes (not shown) may also be mounted in the U-shaped cutouts to thus support the rollers in bearings at either side thereof. Channels 20 are also provided with a plurality of apertures 42 along the lower edge of said channel members. Apertures 42 are provided in paired aligned relationship in each channel 20 to permit mounting a roller 43. Therefore, the rollers 43 will assume the same lower contour as the lower edge of channels 20. It is to be noted that channels 20 (FIGS. 2 and 3) are formed to provide a surface 45 converging with channel 12 and an area of flat surface 46 parallel with channel 12 and an area 47 diverging from channel 12. The frame 19 and particularly the channels 20 are each provided at one end thereof with the aligned apertures 25 through which the shaft 26 passes to pivotally support the frame 19 while the opposite end of the channels 20 are provided with apertures 48 through which a shaft 49 passes. Shaft 26 is provided with a pair of spaced sprockets 56 and 57 positioned adjacent to the channels 20. Shaft 49 is also provided with a pair of spaced sprockets 58 and 59 positioned adjacent to the channels 20. A pair of chains 60 and 61 are mounted so that chain 60 will connect sprockets 56 and 58 while chain 61 will connect sprockets 57 and 59.

Referring to FIG. 5, there are illustrated a pair of mating links 64 and 65. Link 64 is comprised of a flat rectangular perforated base 66 having upturned sides 67 and 68 to form a U-shaped cross section. Link 64 is open at both ends. Link 64 is provided with a pair of pins 69 at either side thereof. Link 65 is comprised of a flat rectangular shaped solid metal block of the same length as link 64 with which it must mate. The width of link 65 is of an exact dimension to fit into link 64 fitting between the sides 67 and 68 and bearing against the upper face of base 66. Link 65 is also provided with a pair of upturned webs 70, provided with a pair of apertures 71. Where a plurality of links are connected in a chain relationship, it is necessary that links 65 fit into links 64, however, it is not necessary to fit each individual link into a mating link, the links may overlap and the pressing operation will be the same.

Referring to FIG. 2 we may see the manner in which links 64 and 65 are mounted on the chains by which they are supported and driven. Link 64 is supported by the pin 69 insertable into a link of the chain 54 on one side and the chain 55 on the opposite side. Links 64 are positioned in abutting relationship along the length of the chains 54 and 55. It is apparent by referring to FIGS. 2 and 3 that the chains 54 and 55 will move around the sprockets at either end and will carry the links 64 in their abutting relationship. It is further apparent that as the links 64 are carried over the rollers 41 that they will be supported by the rollers 41 in a flat horizontal position while passing along the upper edge of channels 14. It is apparent by referring to FIGS. 2 and 3 that the chains 60 and 61 will move around the sprockets at either end thereof and will carry the links 65 in their abutting relationship. Link 65 is supported by the upturned webs 70 (FIG. 5) that are in turn mounted to the pins of the links of the chains 60 and 61. It is further apparent that as the links 65 are carried under the rollers 43 that they will be retained by the rollers 43 in a converging relationship with links 64 along the portion 45 of the frame 19. The links 65 will continue in a flat horizontal relationship parallel to and mating with links 64 in the portion 46 of the frame 19, and will diverge from links 64 in the portion 47 of the frame 19.

Referring to FIGS. 1, 2 and 3, there is illustrated the driving mechanism for the apparatus which includes a speed reducing gear box 80 provided with a pulley 81 on one side thereof that is driven by a belt or chain 82 from a motor (not shown). The opposite side of the gear box 80 is provided with a shaft 83 on which a sprocket 84 is mounted and driven thereby while the opposite end of shaft 83 is mounted in a bearing frame 85. A gear 86 is keyed to shaft 83 and supported within the bearing frame 85. Gear 86 is meshed with another gear 87, gear 87 being keyed to and mounted on a shaft 88. Shaft 88 is also supported in the bearing frame 85. Shaft 88 at its opposite end is provided with a sprocket 89. Shaft 39 of frame 12 on one end thereof is provided with a large sprocket 90 while shaft 49 of frame 19 is provided with a large sprocket 91 of the same size as sprocket 90. Sprocket 91 is positioned on the opposite side of the apparatus to sprocket 90. Sprocket 90 will be positioned in alignment with sprocket 84 while sprocket 91 will be positioned in alignment with sprocket 89. An endless chain 92 is provided, chain 92 passing around sprockets 84 and 90. An endless chain 93 is also provided and mounted to pass around sprockets 89 and 91. There is also provided an arm 94 pivotally mounted at 95 to the base 11. The arm 94 supports a sprocket 96 by a pin 97 in the end of arm 94 and the sprocket 96 is positioned to mesh with the chain 93. A spring 98 is provided being attached to the arm 94 at one end and to the base 11 at the other end. It is apparent that this device will exert a pressure on chain 93 to take up the slack in chain 93 at all times. It is apparent that with the motor drive to sprocket 81 that the shaft 83 will be driven at a constant speed to in turn drive chain 92 which in turn drives sprocket 90 and shaft 39, shaft 39 in turn driving sprockets 52 and 53 which in turn drive the chains 54 and 55 to thus drive the lower links 64 over the rollers 40. The shaft 83 will also drive by means of gear 86 and gear 87 the shaft 88 in an opposite direction to shaft 83. Shaft 88 through sprocket 89 and chain 93 will drive sprocket 91 and shaft 49 and in turn sprockets 58 and 59 to in turn drive chains 60 and 61 at the same speed as the chains on the lower conveyor but in an opposite direction. Chains 60 and 61 will in turn drive the links 65 under the rollers 43 into a mating relationship with links 64. Sprockets 90 and 91 are shown as the same size to be driven at the same speed, they in turn drive the upper and lower conveyor belts at the same speed, it is also apparent that the size of the sprockets 90 and 91 may be changed to produce a slight movement between the conveyor belts such as driving the upper conveyor belt slightly faster than the lower conveyor belt or vice versa. Likewise the gear ratio between gears 87 and 86 may be changed to produce a similar result.

Referring to FIGS. 2 and 3 it is apparent that when a material to be dehydrated is fed into the space or mouth between the two conveyor belts, at the left hand side of the device looking at FIGS. 2 and 3, while the conveyor belts are being driven, the material will rest upon the links 64. Due to the converging relationship between links 64 and links 65 the material will be pressed or compressed as the links move from the converging area 45 to the area 46 where the links meet and mesh in a parallel relationship. With the links 65 forced by the rollers 43 into the mated relationship with links 64 wherein the links 64 are retained by the rollers 40 there is a pressing operation of all material between the mating links. The pressure that may be induced through this particular area depends upon the length of the arm 30, that is, pivotally mounted at the fixed point or fulcrum 31, the particular force that may be exerted on handle 34 is translated to the bearing of bar 33, which moves over and presses upon the frame 19. Bar 33 is rigidly affixed to arm 30 so that the end 33 will slide along the top surface of plate 21. The frame 19 through its rollers 43 will translate the force to the links 65. Since the end of arm 30 is pivotally retained at 31, the closer the bearing arm 32 is positioned to 31, the greater leverage may be obtained. The amount of pressure applied to point 34 and the length of arm 30 will determine the pressure applied to plate 21, and in turn to the rollers 43 and links 65. After the material has been thoroughly pressed in the area 46, the conveyor belts will continue in their movement with the links 65 moving in a diverging relationship to links 64 through the area 47. The dehydrated or pressed material will be carried by links 64 until the links reach the sprockets 52 and 53 when the links, due to their movement in passing around the sprocket, will disperse the dehydrated material that is bedded within the links and dump the material into a container (not shown). Another means of clearing the belt or conveyor 64 is to provide a scraper 99 (FIG. 3). The scraper is positioned at the exit end of the conveyor, but sufficiently forward to permit the links 64 to lift as they move around the end sprockets. It is to be noted that the mating of the two conveyors extends through a considerable flat area 46. The apparatus as illustrated provides an approximate length of three links of the upper conveyor. However, this length may be varied as desired by the length of the two conveyors and by the shape of frame 19 so that there may be less or more links positioned in the aligned relationship. It is also to be noted that the frame 19 is set with the pivotal shaft 26 in one of the openings 25 (FIGS. 2 and 3) depending upon the type of material to be dehydrated, that is, with a heavy or coarse material, the upper apertures 25 would be chosen while with a finer or more easily compressed material the lower apertures 25 would be chosen. It is also to be noted that the frame 19 is controlled in its pivotal movement by shaft 24 which moves in slot 17.

The maximum pressure that may be exerted in a pressing operation cannot force frame 19 beyond the position illustrated in FIG. 3 in which shaft 24 is at the bottom of slot 17. Likewise with any material passing through the conveyors and the pressure exerted on frame 19, the shaft 24 may rise to the upper portion of slot 17 in an emergency. This particular feature is of importance, in the event a non-compressible portion of the material passing between the conveyors forces the rollers 43 upward, this would in turn lift frame 19 and shaft 24 and prevent damage to the machine itself. During this movement of frame 19 the sprocket 91 would also be lifted but due to the take-up device on arm 94 there is sufficient slack in the chain 93 to permit this movement.

Referring to FIG. 7 there is illustrated schematically one manner of applying the desired force upon the upper conveyor during a pressing operation. It is to be remembered that the lower conveyor is retained in a stationary horizontal position and supported in that position by a plurality of rollers while the upper conveyor is pivotally supported and therefore moveable toward or away from the lower conveyor. Thus with the upper conveyor pivotally supported by shaft 26 the arm 30 will provide the means to produce a desired mechanical advantage or force at the bearing point 33 which presses upon the area 46 (which is in turn spaced from the pivotal shaft 26) of the upper frame 19 and in turn the force is translated to the plates of the conveyor.

A modification of the apparatus already described is illustrated in FIG. 8, in which the upper conveyor is provided with an endless flexible iron or steel plate or belt 107. The endless belt 107 is used to replace the links 65 of the upper conveyor. The endless belt 107 may be constructed of a width similar to links 65 to thus fit into the same mating relationship with the lower conveyor links 64. Endless belts 107 and 108 are passed between the mating links 64 and 65. The belts are of sufficient width to fit snugly into the links 64 to rest upon the upper face of the base 66. Belt 107 passes around the upper conveyor and is carried with the movement of links 65. This belt is usually of canvas or rubber and is used to prevent the material being pressed from squeezing through or around the plates 65 of the conveyor. Belt 108 passes around the lower conveyor and is carried with the movement of the links 64. This belt is always a flexible woven material, but is primarily a filter. The belt may be of nylon, woven flexible metal, a wool blanket, etc. A pair of pulleys 105 and 106 (FIG. 8) may be provided one at each end of the device so that the belt 108 may be retained in position. In this embodiment, the pulley 106 is preferably spaced in front of and at some distance from the lower conveyor so that the material that is being compressed and dehydrated will rest upon the endless belt 108. When the lower conveyor moves around the sprockets 52 and 53, the material will be carried forward on the endless belt 108 and as the endless belt moves about the pulley 106 the material will be dumped or unloaded into a container (not shown). It is apparent that roller 106 may be spaced any desired distance in front of the device or roller 106 may be duplicated and belt 108 extended for unloading.

Regarding the size of the pressing plates 64 and 65, this has been designed to vary from a 6" width to a 36" width. The length of each plate may be equal to the width or slightly greater, as desired. The speed of movement of the conveyors may vary from 12' per minute to 24' per minute. The dry pressed material or cake expelled from the conveyor press is usually about ½"; this may vary with some materials to as much as 1", but no more. An example of conveyor press operation may be stated in which a 24" plate or plates are utilized and driven at a speed of 12' per minute, and in which a dry cake of ½" is delivered or expelled. There will be approximately 1 cu. ft. per minute and the weight of cake will be about 60 lbs. per cu. ft., or 3,600 lbs. per hour. This operation will require approximately a 30 H.P. motor. The minimum pressure in lbs. per square inch will be 100 lbs., while the maximum will vary between 600–1,000+ lbs. The maximum thickness or depth of material fed into the press may vary from 4" to 12", depending upon its compressibility. The conveyor press has been found adaptable to continuous pressing of ground wood pulp; wood fibre slurry, Masonite slurry, digested wood pulp, digested flax pulp, ground sugar beets, ground sugar cane, ground banana stalks, garbage disposal waste and many others for a 1" to 3" cake; and apple pulp, spent grains, peat moss, humus, ground orange, lemon and grapefruit peel, tomatoes, grapes, oranges, lemon, grapefruit, precipitated pectin, cannery waste and others for a ½" to 1" cake.

It is apparent that the conveyor press described and illustrated provides a continuous operating device for compressing or dehydrating material and although the press may be used to dehydrate any material that may be conveniently fed between the conveyors, the press is primarily designed to handle the type of material that presents a problem. A problem with materials such as peat (due to its consistency) is that the material will not follow or be drawn between the rollers of the press. It will back up and ooze out in several directions rather than be compressed to be dehydrated. In this type of conveyor a material such as peat is matted or bedded into the links and as the conveyor links converge they compress the material into a tighter matted or bedded position and thus continue to carry the material through the converging area and through the pressing area retaining the material in its position between the links. Although the press as described is capable of handling a great many materials it is necessary in some instances to provide the further embodiment as illustrated in FIG. 8 in which an endless belt 108 such as canvas, nylon, woven metal or an equivalent material is also used to assist in bedding or matting the material as it enters into the converging area of the press. With some materials there is a tendency to stick to the links, in such instances the endless canvas belt 108 is provided to fit over the links 64 and an endless belt 109 may be fitted over the links 65. The sticky material is easily cleaned or broken away from the canvas belts. It is also intended but not illustrated, to provide a trough in base 11 running the length of the press, to catch and drain off the fluid that is removed during the pressing operation.

Although the device has been described and illustrated with a pair of driven conveyors, it is apparent that one conveyor may be driven and not the other or vice versa without departing from the spirit of this invention. It is also apparent that although there is provided a mating design for the links of both conveyors the particular design of the links may be varied as long as a mating relationship exists without departing from the spirit of this invention. It is further apparent that although there is illustrated and described a pair of converging conveyors in which a particular manner of producing the pressure upon the upper conveyor is used to obtain the pressing effect, the manner of producing the pressure may be varied or duplicated in the lower conveyor without departing from the spirit of this invention. Although there is a chain drive illustrated for moving the conveyors, this is incidental as long as the motion or relationship between the conveyors is produced without departing from the spirit of this invention and this invention shall be limited only by the appended claims.

What is claimed is:

1. An endless conveyor press which includes a first and second conveyor one mounted above the other, each being supported by a separate frame, each conveyor being attached to a pair of endless chains, each endless chain being mounted on a pair of sprockets, one of said frames being mounted in a stationary position, the other of said frames being mounted above said first frame and being supported for pivotal movement adjacent one end thereof, said movement being limited by means of a pair of members upstanding from said first frame adjacent the free end of said pivotal frame, said upstanding member having a pair of slots which receive the end portions of shafts extending therethrough from said second frame, said members having aligned apertures at the upper ends thereof pivotally mounting cantilever arms having means thereon for applying pressure on the upper portion of the upper conveyor, each frame supporting said sprockets at opposed ends to in turn support said chains, said first conveyor being comprised of a plurality of rectangular perforated metal plates positioned in continuous abutting relationship, said metal plates being provided with upturned sides, each plate being pivotally connected to two separate links one in each chain on each side of said plates to allow free individual movement of each plate, and a second conveyor comprised of a plurality of solid rectangular flat plates positioned in continuous abutting relationship that fit between the sides of said first conveyor plates and are also pivotally connected to two separate links one in each chain on each side of said plates to allow free individual movement of each plate, a plurality of parallel adjacently positioned rollers mounted in fixed positions to rotate in said stationary frame in a single horizontal plane, a plurality of parallel adjacently positioned rollers mounted in said pivotally supported frame, said rollers being positioned along said second conveyor to carry said second conveyor into and out of a horizontal plane to force said conveyor plates into or out of pressing relation with said first conveyor plates, said perforated plates of first conveyor bearing upon and rolling over said rollers in said stationary frame to provide an unyielding barrier to the pressing of the second conveyor plates, said solid plates of said second conveyor hanging from said pivotally supported frame with a pressing contact and means to move both conveyors at the same speed.

2. In a device according to claim 1, in which said rollers of said stationary frame are mounted in U-shaped slots so that they may be easily lifted out for cleaning.

References Cited in the file of this patent

UNITED STATES PATENTS

| | | |
|---|---|---|
| Re. 22,200 | Richardson | Oct. 13, 1942 |
| 705,071 | Graham | July 22, 1902 |
| 814,987 | Richardson | Mar. 13, 1906 |
| 1,049,614 | Sigler et al. | Jan. 7, 1913 |
| 2,359,070 | Aasted | Sept. 26, 1944 |

FOREIGN PATENTS

| | | |
|---|---|---|
| 24,111 | Great Britain | 1910 |
| 597,490 | Germany | May 25, 1934 |
| 98,235 | Sweden | Mar. 5, 1940 |
| 543,993 | Italy | Nov. 25, 1954 |
| 85,742 | Netherlands | July 15, 1957 |
| 1,165,279 | France | May 27, 1958 |